United States Patent
Katta et al.

(10) Patent No.: US 7,133,936 B2
(45) Date of Patent: Nov. 7, 2006

(54) RING NETWORK AND DATA TRANSMITTER

(75) Inventors: Noboru Katta, Itami (JP); Yuji Mizuguchi, Hirakata (JP); Takahisa Sakai, Amagasaki (JP); Hirotsugu Kawada, Sakai (JP); Toshihiko Kurosaki, Kobe (JP); Nobuhiko Yasui, Moriguchi (JP); Yutaka Takahira, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 110 days.

(21) Appl. No.: 10/398,377

(22) PCT Filed: Oct. 5, 2001

(86) PCT No.: PCT/JP01/08790

§ 371 (c)(1),
(2), (4) Date: Apr. 4, 2003

(87) PCT Pub. No.: WO02/30079

PCT Pub. Date: Apr. 11, 2002

(65) Prior Publication Data

US 2004/0088436 A1  May 6, 2004

(30) Foreign Application Priority Data

Oct. 5, 2000 (JP) .......... 2000-305821
Mar. 6, 2001 (JP) .......... 2001-061323

(51) Int. Cl.
*G06F 15/16* (2006.01)

(52) U.S. Cl. .......... 709/251; 709/222; 709/248
(58) Field of Classification Search .......... 709/251, 709/222, 248, 249
See application file for complete search history.

(56) References Cited

U.S. PATENT DOCUMENTS 4,028,667 A * 6/1977 Breslau et al. .......... 709/225

(Continued)

FOREIGN PATENT DOCUMENTS

EP    0 450 879    10/1991

(Continued)

OTHER PUBLICATIONS

Clayton: "Introduction to Electromagnetic Compatibility" 1992, John Wiley & Sons, New York, US XP022789634, chapters 8 and 13.

(Continued)

*Primary Examiner*—Saleh Najjar
*Assistant Examiner*—Liang-che Wang
(74) *Attorney, Agent, or Firm*—Wenderoth, Lind & Ponack, L.L.P.

(57) ABSTRACT

A ring-shaped network quickly performs initialization even when a plurality of data transmission apparatuses are connected thereto. Each data transmission apparatus outputs received data to a device connected thereto while performing establishment of clock synchronization based on the received data, and when synchronization is established, it resends the received data. Further, when synchronization of the connected device is established, it sends data supplied from the connected device. Further, a master data transmission apparatus outputs data at turn-on of power or immediately after reset, and a next-stage slave data transmission apparatus receives the data to establish synchronization, and resends the received data when synchronization is established. Thus, synchronization of all the data transmission apparatuses is established while making a round of this data, and then synchronization of devices connected to the respective data transmission apparatuses is established.

8 Claims, 7 Drawing Sheets

U.S. PATENT DOCUMENTS

| | | | |
|---|---|---|---|
| 4,083,005 A | | 4/1978 | Looschen |
| 4,547,879 A | | 10/1985 | Hamelin et al. |
| 4,769,839 A | | 9/1988 | Preineder et al. |
| 4,920,546 A | | 4/1990 | Iguchi et al. |
| 4,924,492 A | | 5/1990 | Gitlin et al. |
| 4,982,185 A | | 1/1991 | Holmberg et al. |
| 5,052,021 A | | 9/1991 | Goto et al. |
| 5,206,857 A | | 4/1993 | Farleigh |
| 5,297,163 A | | 3/1994 | Pfeiffer |
| 5,303,265 A | | 4/1994 | McLean |
| 5,812,594 A | | 9/1998 | Rakib |
| 5,850,441 A | * | 12/1998 | Townsend et al. .......... 380/283 |
| 6,157,680 A | | 12/2000 | Betts et al. |
| 6,421,323 B1 | * | 7/2002 | Nelson et al. .............. 370/249 |
| 6,545,532 B1 | | 4/2003 | Maalej et al. |
| 2002/0106037 A1 | | 8/2002 | Gara |
| 2004/0028145 A1 | | 2/2004 | Katta et al. ................. 375/257 |

FOREIGN PATENT DOCUMENTS

| | | |
|---|---|---|
| EP | 0 490 504 | 6/1992 |
| EP | 0 511 786 | 11/1992 |
| JP | 55-38633 | 3/1980 |
| JP | 63-110840 | 5/1988 |
| JP | 63-245033 | 10/1988 |
| JP | 3-195144 | 8/1991 |
| JP | 4-276935 | 10/1992 |
| JP | 4-322532 | 11/1992 |
| JP | 4-345546 | 12/1992 |
| JP | 4-352535 | 12/1992 |
| JP | 6-14419 | 1/1993 |
| JP | 6-29987 | 2/1994 |
| JP | 6-183298 | 7/1994 |
| JP | 06227318 A | 8/1994 |
| JP | 7-50683 | 2/1995 |
| JP | 8-163162 | 6/1996 |
| JP | 3035262 | 12/1996 |
| JP | 11-154859 | 6/1999 |
| JP | 2000-49764 | 2/2000 |

OTHER PUBLICATIONS

Japanese Office Action for 2002–533568 (JP); Nov. 2003.

Oscar Agazzi and Alberto A. Adan, "An Analog Front End of Full–Duplex Digital Transceivers Working on Twisted Pairs", IEEE Journal of Solid–State Circuits, vol. 24, No. 2, Apr. 1989, pp. 229–240.

* cited by examiner

| data | mapping value |
|------|---------------|
| 111  | +7            |
| 110  | +5            |
| 101  | +3            |
| 100  | +1            |
| 011  | -1            |
| 010  | -3            |
| 001  | -5            |
| 000  | -7            |

RING NETWORK AND DATA TRANSMITTER

TECHNICAL FIELD

The present invention relates to a ring-shaped network and a data transmission apparatus and, more particularly, to a ring-shaped network in which a data transmission apparatus receives data to establish synchronization, and outputs the data to a next-stage data transmission apparatus when synchronization is established, thereby establishing synchronization while making a round of the data.

BACKGROUND ART

Conventionally, in order to share information with plural apparatuses, a plurality of data transmission apparatuses each having a transmission unit for transmitting data and a reception unit for receiving data are provided, and the respective data transmission apparatuses are connected in a ring shape to constitute a network.

FIG. 11 is a block diagram illustrating the construction of a conventional ring-shaped network.

With reference to FIG. 11, the conventional ring-shaped network is provided with a plurality of data transmission apparatuses, and each data transmission apparatus is connected to a next-stage data transmission apparatus through a transmission path, and a final-stage data transmission apparatus is connected to an initial-stage data transmission apparatus.

A data transmission apparatus 1010 is provided with a data transmission unit 1011 for transmitting data; an E/O 1014 for converting an electric signal into an optical signal; an optical fiber cable 1016 for transmitting the optical signal; an O/E 1015 for converting an optical signal into an electric signal; a data reception unit 1012 for receiving data; and a clock reproduction unit 1013 for establishing clock synchronization on the basis of the received data. Likewise, a data transmission apparatus 1020 is provided with a data transmission unit 1021, an E/O 1024, an optical fiber cable 1026, an O/E 1025, a data reception unit 1022, and a clock reproduction unit 1023. Further, a data transmission apparatus 1030 is provided with a data transmission unit 1031, an E/O 1034, an optical fiber cable 1036, an O/E 1035, a data reception unit 1032, and a clock reproduction unit 1033.

The initial-stage data transmission apparatus 1010 is connected to the next-stage data transmission apparatus 1020 through the transmission path 1016, the data transmission apparatus 1020 is connected to the data transmission apparatus 1030 through the transmission path 1026, and the final-stage data transmission apparatus 1030 is connected to the initial-stage data transmission apparatus 1010 through the transmission path 1036, thereby constituting a ring-shaped network.

Further, the data transmission apparatus 1010 is a master which transmits data with a clock of its own, and the data transmission apparatuses 1020 and 1030 are slaves which transmit data after clock synchronization is established on the basis of the received data.

Next, the operation of initializing the ring-shaped network so constructed will be described.

Initially, the data transmission apparatus 1010 that functions as a master transmits data to the next-stage data transmission apparatus 1020 with a clock of its own. In the data transmission apparatus 1020, the clock reproduction unit 1023 performs clock reproduction from the received data to establish synchronization, and thereafter, outputs the data to the next-stage data transmission apparatus 1030. In repetition of this operation, when clock synchronization is established by the clock reproduction unit 1013 of the master data transmission apparatus 1010, the ring-network is initialized. When initialization of the ring-shaped network is completed, the respective data transmission apparatuses perform data communication through the network.

There are cases where devices are connected to the respective data transmission apparatuses although they are not shown in the figure. These connected devices perform various kinds of processing on the basis of the data received by the data reception units 1012, 1022, and 1032, and output the results to the data transmission apparatuses 1011, 1021, and 1031, respectively.

In order to initialize the ring-shaped network in which the data transmission apparatuses having the connected devices are connected, initially, synchronization of the data transmission apparatus 1020 is established, and synchronization of the device connected to the apparatus 1020 is established with the synchronization clock. Thereafter, synchronization of the data transmission apparatus 1010 is established, and synchronization of the device connected to the apparatus 1010 is established with the synchronization clock.

However, in the conventional ring-shaped network, after clock synchronization of the previous-stage data transmission apparatus is established, the previous-stage apparatus outputs a signal to the next-stage data transmission apparatus, and the next-stage data transmission apparatus receives the signal to establish clock synchronization. Therefore, initialization takes much time.

Further, when devices are connected to the data transmission apparatuses, synchronization must be established in the respective connected devices, and therefore, initialization takes more time.

Moreover, although FIG. 11 shows an example of a ring-shaped network in which three-stages of data transmission apparatuses are connected, more data transmission apparatuses are connected in an actual ring-shaped network. Therefore, the time required for initialization increases according to the number of data transmission apparatuses connected.

The present invention is made to solve the above-described problems and has for its object to provide a ring-shaped network and a data transmission apparatus, which can perform initialization at high speed even when performing multi-valued transmission.

SUMMARY OF THE INVENTION

In order to solve the above-described problems, according to an embodiment of the present invention, there is provided a ring-shaped network in which plural data transmission apparatuses, each performing data transmission while assigning one or more bits of data as one data symbol to a signal level, are connected via a transmission path, wherein one of the data transmission apparatuses is a master data transmission apparatus while the other data transmission apparatuses are slave data transmission apparatuses; each of the data transmission apparatuses is connected with a device which is supplied with data received by the data transmission apparatus, and outputs a result of processing to the data transmission apparatus; at turn-on of power or immediately after reset, the master data transmission apparatus outputs the data supplied from the connected device, to the transmission path; each of the slave data transmission apparatuses receives, from the transmission path, the data outputted from the data transmission apparatus connected in the previous stage, establishes clock synchronization, outputs the received data to the connected device, and resends the received data to the transmission path; and the slave data transmission apparatus outputs the data supplied from the connected device, to the transmission path, after synchronization of the connected device is established.

Further, according to another embodiment of the present invention, in the ring-shaped network discussed above, the slave data transmission apparatus does not output the data to the transmission path until establishment of clock synchronization is completed.

Further, according to another embodiment of the present invention, there is provided a data transmission apparatus which is connected to a ring-shaped network through a transmission path, and performs data transmission while assigning one or more bits of data as one data symbol to a signal level; and the data transmission apparatus is connected with a device which is supplied with data received by the data transmission apparatus, and outputs a result of processing of the data transmission apparatus; and the data transmission apparatus includes a synchronization detector for establishing synchronization on the basis, of the data inputted through the transmission path, and performing reproduction of a data clock, a connected device synchronization detector for detecting that synchronization of the device is established, and a selector for switching data to be transmitted to the transmission path between the data received through the transmission path and the data supplied from the device.

Further, according to another embodiment of the present invention, in a data transmission apparatus discussed above, the connected device synchronization detector receives the data from the connected device, and reproduces a device clock that is synchronized with the data.

Further, according to another embodiment of the present invention, in a data transmission apparatus discussed above, the connected device synchronization detector receives the data supplied from the connected device, and detects a data frame including the data, thereby to detect that synchronization of the connected device is established.

Further, according to another embodiment of the present invention, in a data transmission apparatus discussed above, the connected device synchronization detector counts the clock that is inputted in synchronization with the data supplied from the connected device, and the data clock that is reproduced by the synchronization detector on the basis of the data received through the transmission path, for a predetermined period of time, thereby to detect that synchronization of the connected device is established.

Further, according to another embodiment of the present invention, in a data transmission apparatus discussed above, the connected device synchronization detector counts the device clock that is reproduced from the data supplied from the connected device, and the data clock that is reproduced by the synchronization detector on the basis of the data received through the transmission path, for a predetermined period of time, thereby to detect that synchronization of the connected device is established.

As described above, according to the embodiment of the present invention, wherein there is provided a ring-shaped network in which plural data transmission apparatuses, each performing data transmission while assigning one or more bits of data as one data symbol to a signal level, are connected via a transmission path, wherein one of the data transmission apparatuses is a master data transmission apparatus while the other data transmission apparatuses are slave data transmission apparatuses; each of the data transmission apparatuses is connected with a device which is supplied with data received by the data transmission apparatus, and outputs a result of processing to the data transmission apparatus; at turn-on of power or immediately after reset, the master data transmission apparatus outputs the data supplied from the connected device, to the transmission path; the slave data transmission apparatus receives, from the transmission path, the data outputted from the data transmission apparatus connected in the previous stage, establishes clock synchronization, outputs the received data to the connected device, and resends the received data to the transmission path; and the slave data transmission apparatus outputs the data supplied from the connected device, to the transmission path, after synchronization of the connected device is established, synchronization of the respective data transmission apparatuses can be established on the basis of received data to initialize the ring-shaped network. Further, synchronization of the next-stage data transmission apparatus can be established by resending the data to the apparatus without waiting for completion of establishment of clock synchronization in the connected device, whereby the ring-shaped network can be initialized more speedily.

Further, according to the embodiment of the present invention, in the ring-shaped network discussed above, wherein the slave data transmission apparatus does not output the data to the transmission path until establishment of clock synchronization is completed, the data can be transmitted after clock synchronization of the slave data transmission apparatus is established.

Further, according to the embodiment of the present invention discussed above, wherein there is provided a data transmission apparatus which is connected to a ring-shaped network via a transmission path, and performs data transmission while assigning one or more bits of data as one data symbol to a signal level; and the data transmission apparatus is connected with a device which is supplied with data received by the data transmission apparatus, and outputs a result of processing to the data transmission apparatus; and the data transmission apparatus includes a synchronization detector for establishing synchronization on the basis of the data inputted through the transmission path, and performing reproduction of a data clock, a connected device synchronization detector for detecting that synchronization of the device is established, and a selector for switching data to be transmitted to the transmission path between the data received through the transmission path and the data from the device. Therefore, the data transmission apparatus resends the received data until synchronization of the connected device is established, and it can output the data supplied from the connected device when synchronization of the connected device has been established.

Further, according to the embodiment of the present invention, wherein in the data transmission apparatus defined in claim 3, the connected device synchronization detector receives the data supplied from the connected device, and reproduces a device clock that is synchronized with the data. Therefore, the data transmission apparatus can perform processing even when no clock is supplied from the connected device.

Further, according to the embodiment of the present invention wherein, in the data transmission apparatus defined in claim 3 or claim 4, the connected device synchronization detector receives the data supplied from the connected device, and detects a data frame including the data, thereby to detect that synchronization of the connected device is established. Therefore, the data transmission apparatus can detect synchronization of the connected device.

Further, according to the embodiment of the present invention wherein, in the data transmission apparatus, the connected device synchronization detector counts the clock that is inputted in synchronization with the data supplied from the connected device, and the data clock that is reproduced by the synchronization detector on the basis of the data received through the transmission path, for a predetermined period of time, thereby to detect that synchronization of the connected device is established. Therefore, the data transmission apparatus can detect establishment of synchronization of the connected device even when the inputted data is not stored in a frame.

Further, according to the embodiment of the present invention wherein, in the data transmission apparatus, the connected device synchronization detector counts the device clock that is reproduced from the data supplied from the connected device, and the data clock that is reproduced by the synchronization detector on the basis of the data received through the transmission path, for a predetermined period of time, thereby to detect that synchronization of the connected device is established. Therefore, the data transmission apparatus can detect establishment of synchronization of the connected device even when the inputted data is not stored in a frame. Further, it can perform processing even when no clock is supplied from the connected device.

DETAILED DESCRIPTION OF THE INVENTION

Hereinafter, an embodiment of the present invention will be described with reference to the drawings. The embodiment described hereinafter is merely an example, and the present invention is not necessarily restricted thereto.

(Embodiment 1)

A ring-shaped network, and a data transmission apparatus will be described as a first embodiment of the invention, with reference to the drawings.

Figure 1:
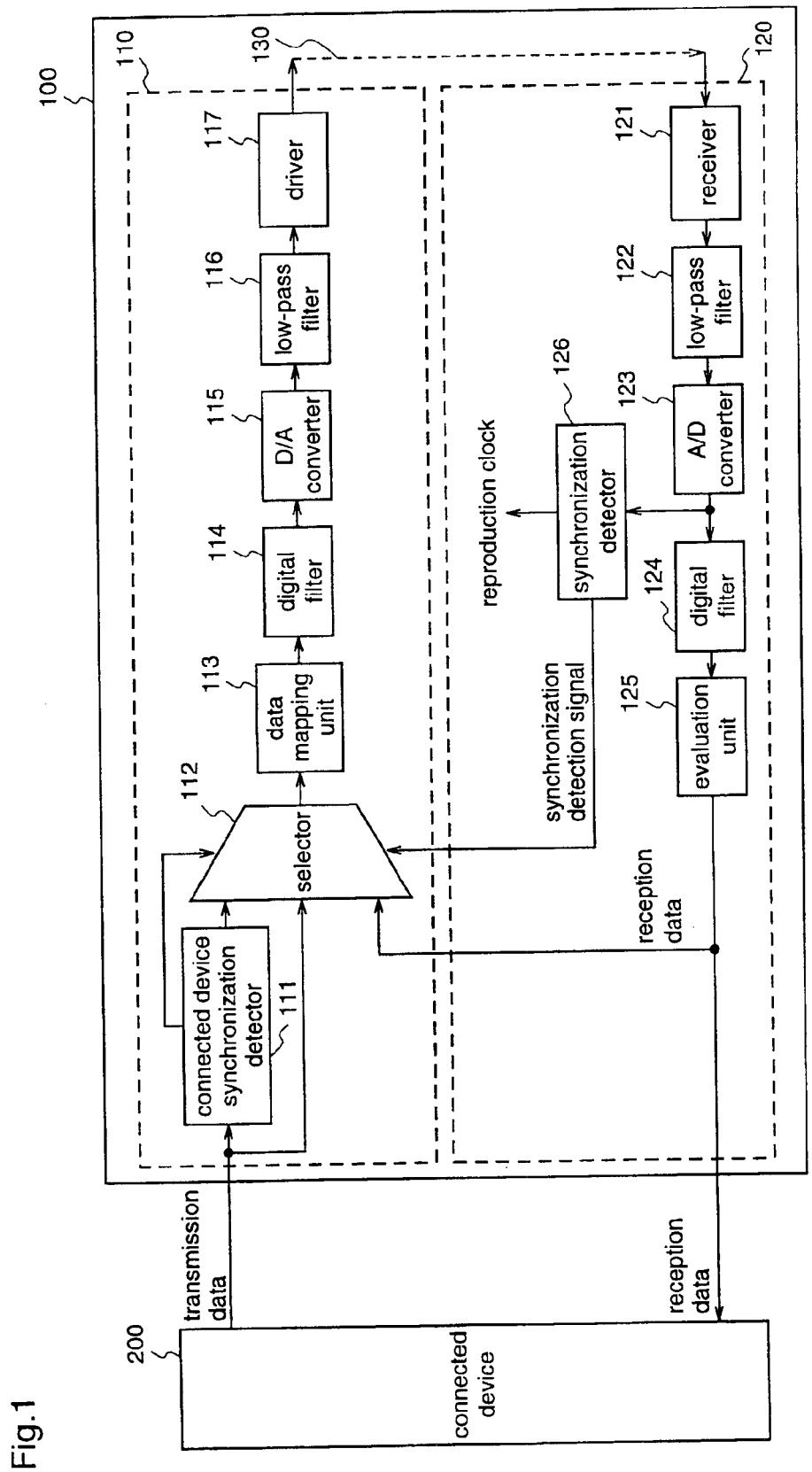
FIG. 1 is a block diagram illustrating the construction of a data transmission apparatus according to a first embodiment of the present invention.

FIG. 1 is a block diagram illustrating the construction of a data transmission apparatus according to the first embodiment.

With reference to FIG. 1, a data transmission apparatus 100 according to the first embodiment comprises a transmission unit 110 for outputting data, a reception unit 120 for receiving the data outputted from the transmission unit 110, and a transmission path 130 for transmitting the data outputted from the transmission unit 110. A device 200 is connected to this data transmission apparatus 100, and the connected device 200 performs processing on the basis of the data outputted from the reception unit 120, and outputs the result to the transmission unit 110.

The transmission unit 110 is provided with a connected device synchronization detector 111 for detecting establishment of synchronization in the connected device 200; a selector 112 for selecting data to be transmitted; a data mapping unit 113 for mapping a digital signal to be transmitted to any of eight signal levels at every symbol timing; a digital filter 114 which allows a band of frequency components corresponding to half of the symbol rate to pass; a D/A converter 115 for converting digital data into an analog signal; a low-pass filter 116 for removing noises outside the signal band of the transmitted signal; and a driver 117 for amplifying the signal intensity, and outputting the signal to the transmission path 130.

On the other hand, the reception unit 120 is provided with a receiver 121 for receiving a signal; a low-pass filter 122 for removing noises outside the signal band; an A/D converter for converting the signal into digital data; a digital filter 124 which allows a band of frequency components corresponding to half of the symbol rate to pass; an evaluation unit 125 for decoding data symbols; and a synchronization detection unit 126 for establishing synchronization.

Further, a coaxial cable or a twisted-pair line is employed as the transmission path 130. When the transmission path 130 is a twisted-pair line, the driver 117 must be a differential output type driver.

Figure 2:
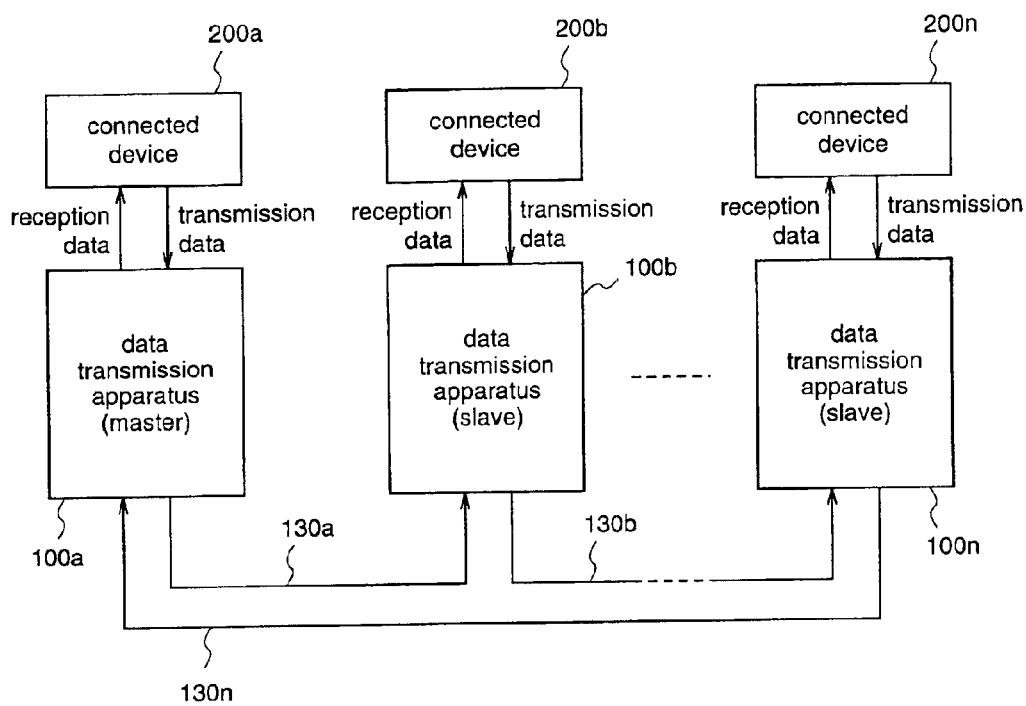
FIG. 2 is a block diagram illustrating the construction of a ring-shaped network to which the data transmission apparatus according to the first embodiment of the present invention is connected.

FIG. 2 is a block diagram illustrating the construction of a ring-shaped network according to the first embodiment.

With reference to FIG. 2, the ring-shaped network according to the first embodiment comprises n stages of data transmission units, each comprising a data transmission apparatus which performs transmission and reception of data, and a connected device which performs processing on the basis of data outputted from the data transmission apparatus to output the result to the data transmission apparatus, and the n stages of data transmission units are connected in a ring shape such that an output from a previous-stage data transmission unit is input to a next-stage data transmission unit, and an output from a final-stage data transmission unit is input to an initial-stage data transmission unit.

All of the data transmission apparatus are identical in construction to the data transmission apparatus 100. That is, the first data transmission apparatus 100a is provided with a transmission unit 110a, a reception unit 120a, and a transmission path 130a although these elements are not shown in FIG. 2, and further, it is connected with a device 200a which performs processing on the basis of the data outputted from the reception unit 120a to output the result to the transmission unit 110a. The transmission unit 110a is provided with a connected device synchronization detector 111a, a selector 112a, a data mapping unit 113a, a digital filter 114a, a D/A converter 115a, a low-pass filter 116a, and a driver 117a. The reception unit 120a is provided with a receiver 121a, a low-pass filter 122a, an A/D converter 123a, a digital filter 124a, an evaluation unit 125a, and a synchronization detector 126a.

Likewise, the second data transmission apparatus 100b is provided with a transmission unit 110b, a reception unit 120b, and a transmission path 130b, and further, it is connected with a device 200b which performs processing on the basis of the data outputted from the reception unit 120b to output the result to the transmission unit 110b. The transmission unit 110b is provided with a connected device synchronization detector 111b, a selector 112b, a data mapping unit 113b, a digital filter 114a, a D/A converter 115b, a low-pass filter 116b, and a driver 117b. The reception unit 120b is provided with a receiver 121b, a low-pass filter 122b, an A/D converter 123b, a digital filter 124a, an evaluation unit 125b, and a synchronization detector 126b.

Furthermore, the final-stage data transmission apparatus 100n is provided with a transmission unit 10n, a reception unit 120n, and a transmission path 130n, and further, it is connected with a device 200n which performs processing on the basis of the data outputted from the reception unit 120n to output the result to the transmission unit 110n. The transmission unit 110n is provided with a connected device synchronization detector 111n, a selector 112n, a data mapping unit 113n, a digital filter 114n, a D/A converter 115n, a low-pass filter 116n, and a driver 117n. The reception unit 120n is provided with a receiver 121n, a low-pass filter 122n, an A/D converter 123n, a digital filter 124n, an evaluation unit 125n, and a synchronization detector 126n.

The transmission unit 110a of the first data transmission apparatus 100a is connected to the reception unit 120b of the second data transmission apparatus 100b through the transmission path 130a, the transmission unit 10b of the second data transmission apparatus 100b is connected to the reception unit 120c of the third data transmission apparatus 100c through the transmission path 130b, and the transmission unit 110n of the final-stage (n-th) data transmission apparatus 100n is connected to the reception unit 120a of the initial-stage (first) data transmission apparatus 100a through the transmission path 130n, thereby constituting the ring-shaped network.

The first data transmission apparatus 10a functions as a master, and it transmits data with a clock of its own at turn-on of power or immediately after reset. On the other hand, the data transmission apparatuses 100b to 100n function as slaves, and these apparatuses establish clock synchronization on the basis of the received data at turn-on of power or immediately after reset and, thereafter, output the data.

Next, the operation of the data transmission apparatus 100 will be described.

Figure 3:
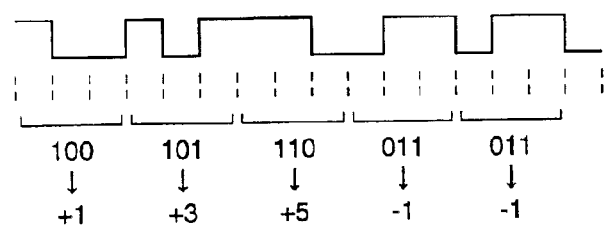
FIG. 3 is a diagram illustrating an example of a digital data string to be transmitted by the data transmission apparatus according to the first embodiment of the present invention.
Figures 4, 5:
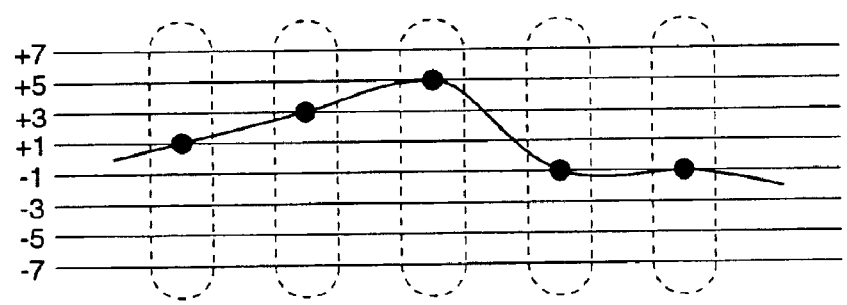
FIG. 4 is a diagram for explaining conversion of data symbols into signal levels (mapping values) by the data transmission apparatus according to the first embodiment of the present invention.
FIG. 5 is a diagram illustrating an example of a waveform which is outputted onto a transmission path by the data transmission apparatus according to the first embodiment of the present invention.

FIG. 3 is a diagram illustrating an example of a digital data string to be transmitted. The data mapping unit 113 combines every three bits of data in the digital data string to make data symbols, and maps each data symbol to a signal level according to a conversion table shown in FIG. 4. FIG. 4 is a conversion table illustrating conversion from data symbols to signal levels (mapping values), wherein each data symbol comprising three bits of data is mapped to any of eight signal levels. In the example shown in FIG. 3, a symbol "100" is mapped to a signal level "+1" at a certain symbol timing. Likewise, symbols "101", "110", "011", and "011" are mapped to signal levels "+3 ", "+5", "−1", and "−1" at the subsequent symbol timings, respectively.

Hereinafter, the data transmission apparatus 100 will be described as one performing such 8-value transmission.

Initially, ordinary data transmission will be described. During ordinary data transmission, the selector 112 selects transmission data supplied from the connected device 200, and inputs the data to the data mapping unit 113. Then, the data mapping unit 113 divides the transmission data into groups of three bits, and maps each 3-bit data to one of eight signal levels on the basis of the conversion table shown in FIG. 4. The digital filter 114 is a low-pass filter that allows a band of frequency components corresponding to half of the symbol rate to pass, and actually it is constituted so as to have appropriate roll-off characteristics in combination with the digital filter 124 of the reception unit 120. The signal that has passed through the digital filter 114 is converted into an analog signal by the D/A converter 115, and the analog signal is passed through the low-pass filter 116, whereby a signal within a band that is slightly larger than half of the symbol rate is obtained, and a signal having no interference between adjacent codes is obtained at readout timing. Thereby, data transmission in the finite band can be carried out. Then, the driver 117 amplifies the signal intensity of this signal, and outputs the signal to the transmission path 130.

An example of a waveform thus outputted onto the transmission path is shown in FIG. 5. In the example of FIG. 5, the signal levels "+1", "+3", "+5", "−1", and "−1" which are mapped by the data mapping unit 113 are outputted in a waveform.

The signal so transmitted is received by the reception unit 120.

In the reception unit 120, the receiver 121 receives the signal, and the low-pass filter 122 removes noises outside the signal band. Then, the A/D converter 123 converts the signal into digital data, and the digital data is passed through the digital filter 124. The digital filter 124 has roll-off characteristics in combination with the digital filter 114, and it converts the digital data into a signal that can be received without being affected by interference between adjacent codes, at appropriate timing. Thereafter, the evaluation unit 125 decodes the signal levels to data symbols, and inputs the received data to the connected device 200 and to the selector 112 of the transmission unit 110. The synchronization detector 126 reproduces a clock from the received data, and establishes synchronization when decoding the data symbols. Ordinary data transmission is carried out as described above.

Next, the method for establishing clock synchronization of the ring-shaped network so constructed will be described with reference to FIG. 6.

Figure 6:
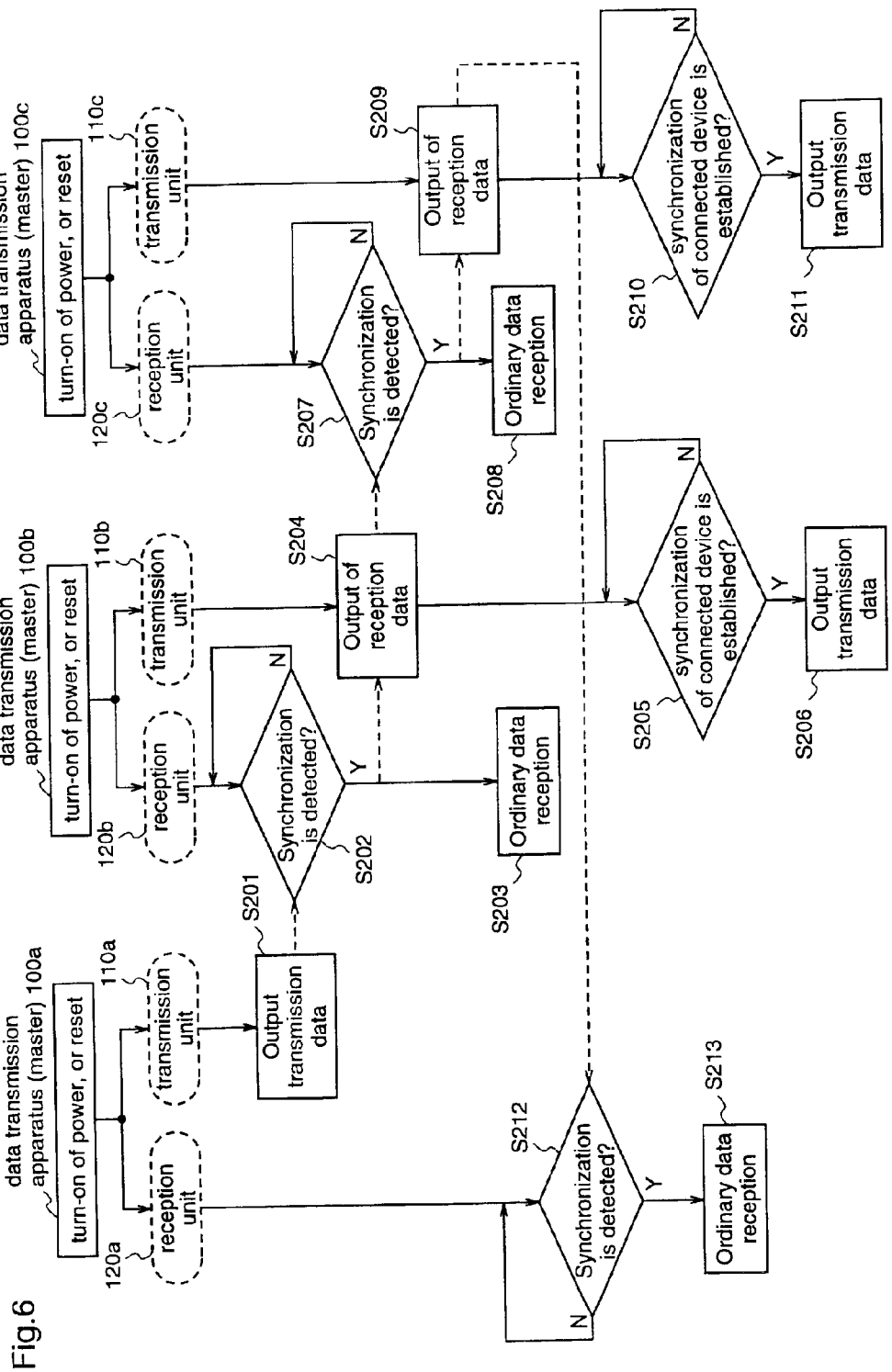
FIG. 6 is a flowchart for explaining the operation of the ring-shaped network according to the first embodiment of the present invention for establishing clock synchronization.

FIG. 6 is a flowchart for explaining the operation of the ring-shaped network for establishing clock synchronization. Here, a ring-shaped network comprising three stages of data transmission apparatuses 100a to 100c will be described.

At turn-on of power or immediately after reset, the transmission unit 110a of the first data transmission apparatus 100a outputs transmission data. That is, the selector 112a inputs the transmission data to the data mapping unit 113a. Then, the transmission data mapped to the signal levels are converted into an analog signal in like manner as the ordinary data transmission, and the analog signal is output to the transmission path 130a (step S201).

The transmission data is received by the reception unit 120b of the second data transmission apparatus 100b. On receipt of the transmission data, the synchronization detector 126b performs clock reproduction to establish synchronization. Further, the signal levels of the received data are converted into a digital signal in like manner as the ordinary data transmission, and the digital signal is output to the connected device 200b and to the selector 112b of the transmission unit 110b. When the synchronization detector 126b has established synchronization, it outputs a synchronization detection signal to the selector 112b of the transmission unit 110b (step S202).

When synchronization is established by the synchronization detector 126b, the reception unit 120b goes into the state where it can perform data reception (step S203).

On the other hand, when the synchronization detection signal is input to the selector 112b, the transmission unit 110b resends the data received by the reception unit 120b. That is, the selector 112b inputs the received data that is supplied from the evaluation unit 125b, to the data mapping unit 113b. Then, the mapped data is resent to the transmission path 130b in like manner as the ordinary data transmission (step S204).

Since, at this time, the connected device 200b establishes synchronization on the basis of the reception data supplied from the reception unit 120b, the transmission unit 110b detects establishment of synchronization in the connected device 200b by the connected device synchronization detector 111b.

Figure 7:
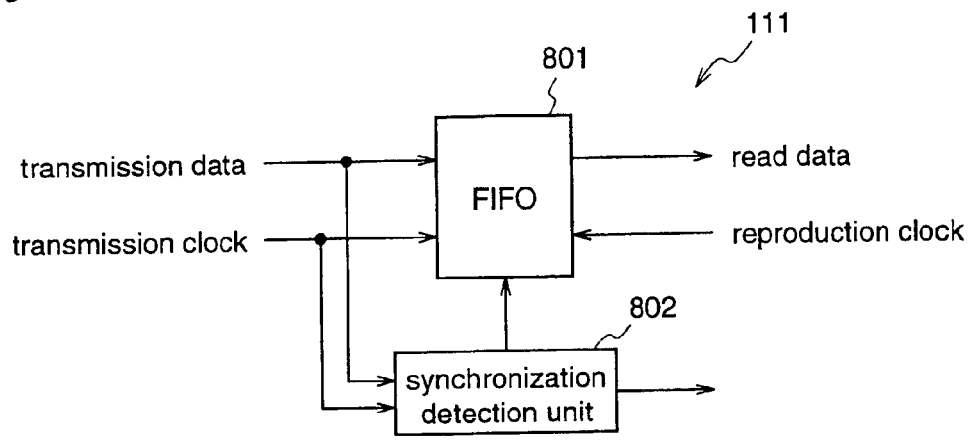
FIG. 7 is a block diagram illustrating the construction of a connected device synchronization detector according to the first embodiment of the present invention.

An example of the construction of the connected device synchronization detector 111b is shown in FIG. 7, wherein the detector 111b has an FIFO 801 and a synchronization detector 802. The FIFO 801 is a ring buffer for delaying the transmission data supplied from the connected device 200b, and the FIFO 801 reads the data from a position indicted by a pointer to output it to the selector 112b. The synchronization detector 802 detects a data frame including data on the basis of the transmission data and transmission clock from the connected device 200b. For example, it periodically detects a frame header included in a data frame, thereby detecting establishment of synchronization in the connected device 200b. When the synchronization detector 802 has detected establishment of synchronization, it outputs a connected device synchronization detection signal to the selector 112b. Further, the pointer for indicating the position where data are outputted from the FIFO 801 is placed in a predetermined position, and readout of data is carried out at the reproduction clock that is reproduced by the reception unit 120b. That is, the connected device 200b performs processing on the basis of the data outputted from the first data transmission apparatus 100a in the previous stage, and the result of processing is output to the selector 112b (step S205).

When synchronization of the connected device 200b has been established, the selector 112b selects the data from the connected device 200b as transmission data, whereby the transmission unit 110b goes into the state where it can output the transmission data (step S206).

The transmission data outputted from the second data transmission apparatus 100b is received by the reception unit 120c of the third data transmission apparatus 100c. When the reception unit 120c receives the transmitted data, the synchronization detector 126c performs clock reproduction to establish synchronization. The signal levels of the received data are converted into a digital signal in like manner as the ordinary data transmission, and the digital signal is output to the connected device 200c and to the selector 112c of the transmission unit 110c. When the synchronization detector 126c has established synchronization, it outputs a synchronization detection signal to the selector 112c of the transmission unit 110c (step S207).

When the synchronization detector 126c has established synchronization, the reception unit 120c is in the state where it can perform data reception (step S208).

On the other hand, when the synchronization detection signal is input to the selector 112c, the transmission unit 110c resends the reception data received by the reception unit 120c. That is, the selector 112c inputs the reception data supplied from the evaluation unit 125c to the data mapping unit 113c. The mapped reception data is resent to the transmission path 130c in the same manner as the ordinary data transmission (step S209).

Since, at this time, the connected device 200c establishes synchronization on the basis of the reception data that is supplied from the reception unit 120c, the transmission unit 110c detects establishment of synchronization in the connected device 200c by the connected device synchronization detector 111c.

The connected device synchronization detector 111c is identical in construction to the connected device synchronization detector 111b. That is, the FIFO 801 delays the transmission data from the connected device 200c, and reads the data from the position indicated by the pointer to output it to the selector 112c. Further, the synchronization detector 802 detects synchronization of the connected device 200c on the basis of the transmission data and transmission clock from the connected device 200c. When the synchronization detector 802 detects synchronization, it outputs a connected device synchronization detection signal to the selector 112c. Further, the pointer of the FIFO 801 is placed in a predetermined position, and readout of data is carried out with the reproduction clock reproduced by the reception unit 120c. That is, the connected device 200c performs processing on the basis of the data supplied from the second data transmission apparatus 100b in the previous stage, and outputs the result to the selector 112c (step S210).

When synchronization of the connected device 200c has been established, the selector 112c selects the data from the connected device 200c as transmission data, and the transmission unit 110c is in the state where it can output the transmission data (step S211).

The transmission data outputted from the third data transmission apparatus 100c is received by the reception unit 120a of the first data transmission apparatus 100a. When the transmission data is received by the reception unit 120a, the synchronization detector 126a performs clock reproduction to establish synchronization. Further, the signal levels of the reception data are converted into a digital signal to be output to the connected device 200a (step S212).

When synchronization has been established by the synchronization detector 126a, the reception unit 120a is in the state where it can perform data reception (step S213).

When clock synchronization has been established in the data transmission apparatuses 10a to 100c constituting the ring-shaped network and the connected devices 200a to 200c as described above, transmission and reception of data through the network are started.

As described above, the data transmission apparatus 100 according to the first embodiment is provided with the synchronization detector 126 for establishing synchronization on the basis of data inputted through the transmission path 130, and reproducing a data clock; the connected device synchronization detector 111 for detecting that synchronization of the connected device 200 is established; and the selector 112 for selecting either the data received by the reception unit 120 or the data supplied from the connected device 200, and outputting the selected data to the transmission path 130. Therefore, the data transmission apparatus 100 resends the data received by the reception unit 120 until synchronization of the connected device 200 is established, and it can send the data supplied from the connected device 200 after establishment of synchronization of the connected device 200.

Further, in the ring-shaped network in which a plurality of data transmission apparatuses 100 as described above are connected in a ring shape, one of the data transmission apparatuses 100 serves as a master while the other data transmission apparatuses 100 serve as slaves. At turn-on of power or immediately after reset, the first data transmission apparatus 100a as a master outputs the data from the connected device 200a to the transmission path 130a, and the second data transmission apparatus 100b as a slave receives the data to establish clock synchronization. Then, the apparatus 100b outputs the received data to the transmission path 130b and to the connected device 200b, thereby establishing synchronization of all the data transmission apparatuses connected in the network as well as synchronization of the connected device 200. Thereafter, data to be transmitted to the transmission path 130 is switched to the data supplied from the connected device 200. Therefore, synchronization of the respective data transmission apparatuses 100 can be established, whereby the ring-shaped network can be initialized. Further, since synchronization of the next-stage data transmission apparatus can be established by resending the data without waiting for completion of establishment of clock synchronization in the connected device 200, the ring-shaped network can be initialized more quickly.

Further, the second to n-th data transmission apparatuses 100b to 100n as slaves do not transmit data to the transmission paths 130b to 130n until establishment of clock synchronization is completed, data can be transmitted after establishment of clock synchronization in the second to n-th data transmission apparatuses 100b to 100n.

In this first embodiment, as shown in FIG. 4, each 3-bit data is mapped to any of the eight signal levels "−7", "−5", "−3", "−1", "+1", "+3", "+5", and "+7" in the data mapping unit 113. However, the present invention is not restricted to such 8-value transmission, and arbitrary multi-valued transmission can be carried out.

Further, although the connected device synchronization detector 111 shown in FIG. 7 is described as a connected device synchronization detector, this is merely an example, and other connected device synchronization detectors 111-1 to 111-3 may be employed.

Figure 8:
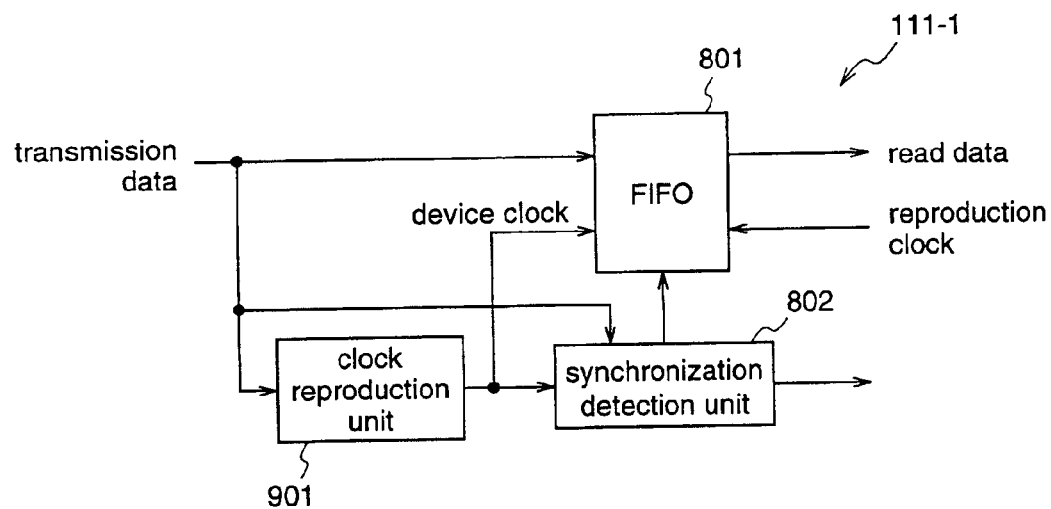
FIG. 8 is a block diagram illustrating another example of the construction of the connected device synchronization detector according to the first embodiment of the present invention.

FIG. 8 is a block diagram illustrating another example of the construction of the connected device synchronization detector. For example, in the case where no transmission clock is input to the connected device synchronization detector 111, a connected device synchronization detector 111-1 may be employed, which includes a clock reproduction unit 901 that performs clock reproduction on the basis of the transmission data supplied from the connected device 200 to establish synchronization. The synchronization detector 802 detects a data frame including the data on the basis of the transmission data supplied from the connected device 200 and the device clock supplied from the clock reproduction unit 901, and detects establishment of synchronization of the connected device 200. When synchronization is detected, readout of data is carried out with the reproduction clock that is obtained in the reception unit 120.

Since clock reproduction is carried out inside the connected device synchronization detector 111 as described above, establishment of synchronization can be detected even when no transmission clock is inputted.

Figure 9:
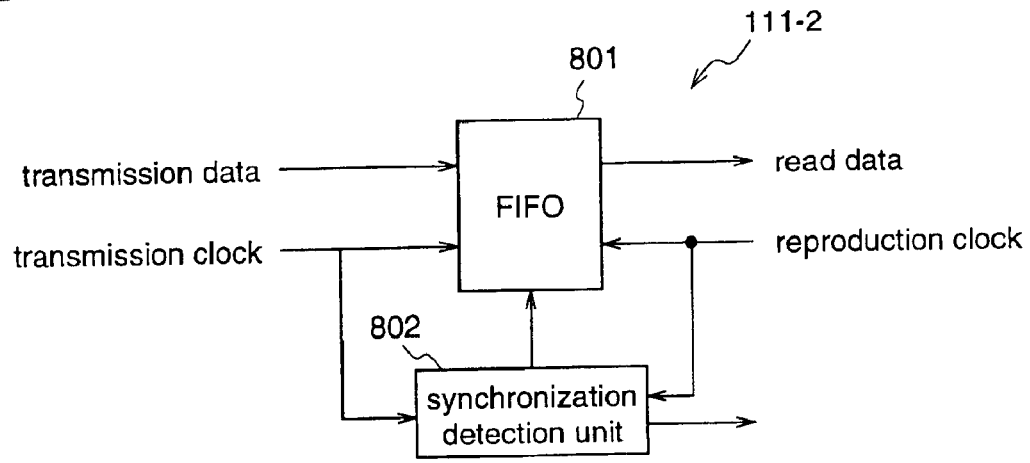
FIG. 9 is a block diagram illustrating another example of the construction of the connected device synchronization detector according to the first embodiment of the present invention.
Figure 10:
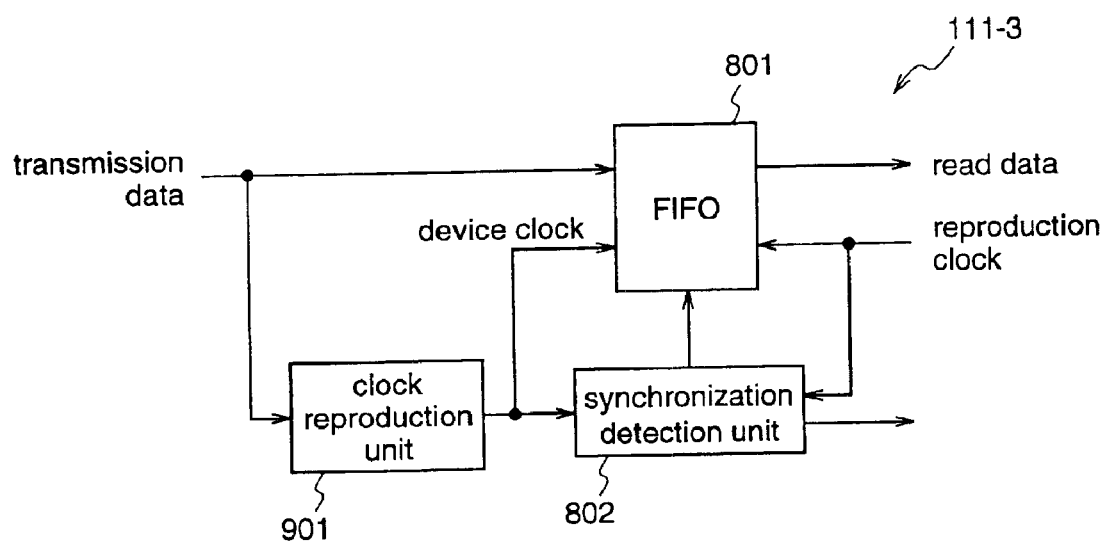
FIG. 10 is a block diagram illustrating another example of the construction of the connected device synchronization detector according to the first embodiment of the present invention.
Figure 11:
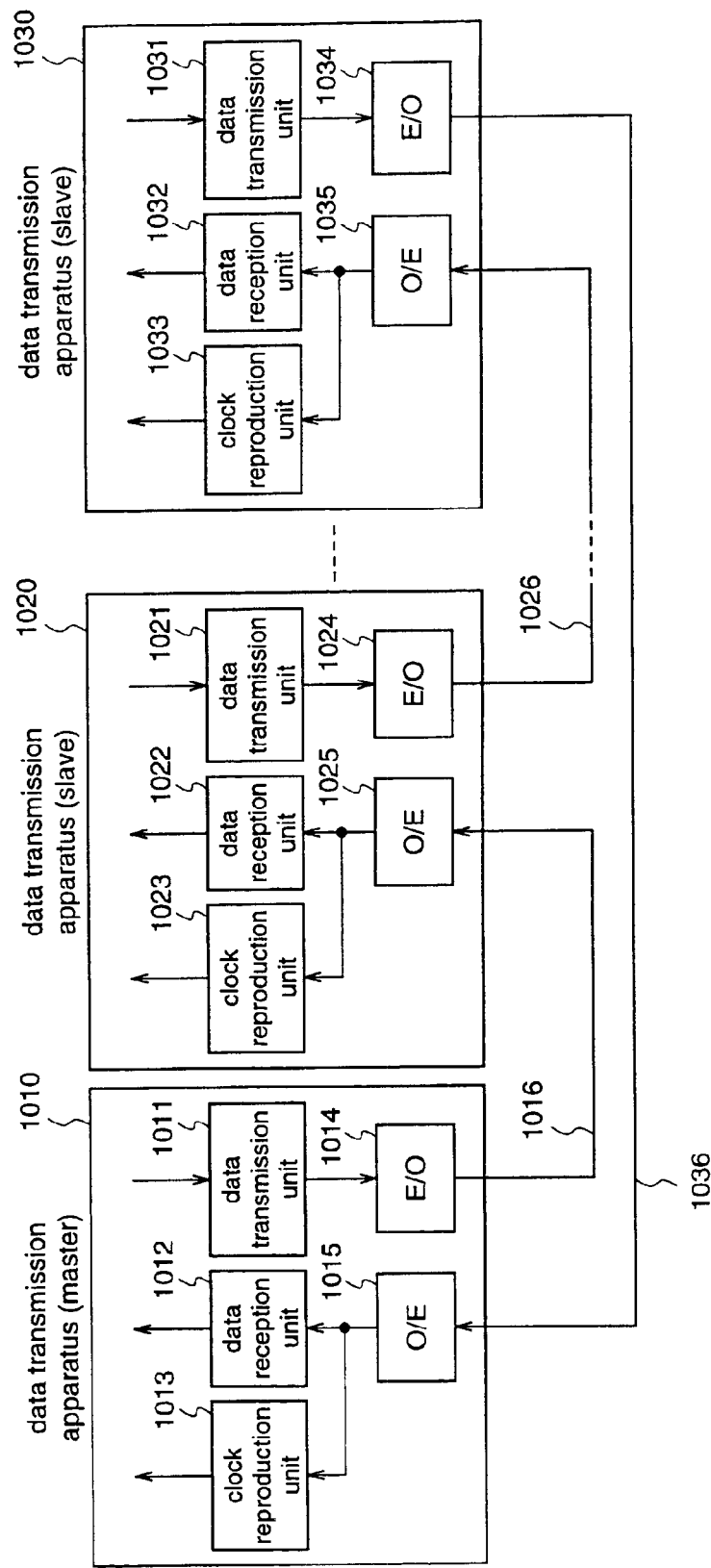
FIG. 11 is a block diagram illustrating the construction of the conventional ring-shaped network.

Further, FIG. 9 and 10 are block diagrams illustrating other examples of the construction of the connected device synchronization detector. For example, in the case where the transmission data is not stored in a frame, a connected device synchronization detector 111-2 or 111-3 may be employed, which detects synchronization by inputting the reproduction clock obtained by the reception unit 120 to the synchronization detector 802, and detecting matching of the reproduction clock with the transmission clock supplied from the connected device 200 or clock reproduced from the data supplied from the connected device 200.

In the connected device synchronization detector 111-2 shown in FIG. 9, the transmission clock from the connected device 200 and the reproduction clock are input to the synchronization detector 802. Then, the synchronization detector 802 counts the transmission clock and the reproduction clock for a predetermined period of time to detect frequency matching, thereby detecting that synchronization of the connected device 200 is established.

Further, in the connected device synchronization detector 111-3 shown in FIG. 10, the device clock reproduced by the clock reproduction unit 901 and the reproduction clock are input to the synchronization detector 802. Then, the synchronization detector 802 counts the device clock and the reproduction clock for a predetermined period of time to detect frequency matching, thereby detecting that synchronization of the device is established.

In this way, since each of the connected device synchronization detectors 111-2 and 111-3 detects synchronization by detecting matching of the reproduction clock with the clock reproduced from the data supplied from the connected device 200, even when the transmission data is not stored in a frame, establishment of synchronization can be detected.

APPLICABILITY IN INDUSTRY

A data transmission apparatus according to the present invention performs establishment of synchronization on receipt of data, and outputs the data to a connected device and, when establishment of synchronization is completed, the apparatus outputs the data to a transmission path. Therefore, in a ring-shaped network constituted by plural data transmission apparatuses, synchronization of all data transmission apparatuses can be established while making a round of data, without waiting for establishment of synchronization in connected devices, whereby initialization of the ring-shaped network can be carried out at high speed.

What is claimed is:

1. A data transmission apparatus for connection to a ring-shaped network comprising a master data transmission apparatus and at least one other data transmission apparatus via a transmission path, for transmitting data by assigning one or more bits of the data as one data symbol to a signal level, and for connection with a device that is operable to be supplied with data received by said data transmission apparatus, to process data received by said data transmission apparatus and to output a result of the processing to said data transmission apparatus, said data transmission apparatus comprising:

a synchronization detector operable to establish synchronization based on data inputted via the transmission path and to reproduce a data clock;

a connected device synchronization detector operable to detect establishment of synchronization of the device; and a selector operable to select the data inputted via the transmission path for output to the transmission path when said connected device synchronization detector has not detected the establishment of synchronization of the device and select data supplied from the device for output to the transmission path when said connected device synchronization detector detects the establishment of synchronization of the device, wherein said data transmission apparatus operates in synchronization with a clock of the master data transmission apparatus.

2. A data transmission apparatus as defined in claim 1, wherein said connected device synchronization detector is operable to receive the data from the device and to reproduce a device clock that is synchronized with the data from the device.

3. A data transmission apparatus as defined in claim 2, wherein said connected device synchronization detector is further operable to count the device clock that is reproduced from the data from the device, and the data clock that is reproduced by said synchronization detector based on the data received via the transmission path, for a predetermined period of time, to detect the establishment of synchronization of the device.

4. A data transmission apparatus as defined in claim 2, wherein said connected device synchronization detector is operable to receive the data from the device and to detect a data frame including the data, to detect the establishment of synchronization of the device.

5. A data transmission apparatus as defined in claim 1, wherein said connected device synchronization detector is operable to receive the data from the device and to detect a data frame including the data, to detect the establishment of synchronization of the device.

6. A data transmission apparatus as defined in claim 1, wherein said connected device synchronization detector is operable to count a clock that is inputted in synchronization with the data from the device, and the data clock that is reproduced by said synchronization detector based on the data received via the transmission path, for a predetermined period of time, to detect the establishment of synchronization of the device.

7. A network comprising:

a plurality of data transmission apparatuses, each being operable to transmit data via a transmission path by assigning at least one bit of the data as one data symbol to a signal level, said plurality of data transmission apparatuses being connected to one another via the transmission path to form a multi-staged ring-shaped network; and a plurality of data devices, each being connected to a corresponding one of said plurality of data transmission apparatuses, wherein each of said data transmission apparatuses is operable to receive, and to supply said corresponding data device, with data, wherein each of said data devices is operable to process the data supplied by said corresponding data transmission apparatus and to output a result of the processing to said corresponding data transmission apparatus, wherein one of said data transmission apparatuses is a master data transmission apparatus, while every other data transmission apparatus is a slave data transmission apparatus, wherein each of said at least one slave data transmission apparatus is operable to receive, from the transmission path, data outputted from a data transmission apparatus connected in a previous stage, to establish a clock synchronization, to output the received data to said corresponding data device, and to resend the received data to the transmission path, wherein each of said at least one slave data transmission apparatus is further operable to output the result of the processing of said corresponding data device to the transmission path after the clock synchronization of said corresponding data device is established, and wherein each of said plurality of data transmission apparatuses comprises:

a synchronization detector operable to establish the clock synchronization based on the received data and to reproduce a data clock;

a connected device synchronization detector operable to detect establishment of the clock synchronization of said corresponding data device; and a selector operable to select the data inputted via the transmission path for output to the transmission path when said connected device synchronization detector has not detected the establishment of synchronization of said corresponding data device and select data supplied from said corresponding data device for output to the transmission path when said connected device synchronization detector detects the establishment of the clock synchronization of said corresponding data device, and wherein said at least one slave data transmission apparatus operates in synchronization with a clock of said master data transmission apparatus.

8. A network as defined in claim 7, wherein each of said at least one slave data transmission apparatus is operable to output data to the transmission path only when establishment of the clock synchronization is completed.

* * * * *

UNITED STATES PATENT AND TRADEMARK OFFICE
CERTIFICATE OF CORRECTION

PATENT NO. : 7,133,936 B2
APPLICATION NO. : 10/398377
DATED : November 7, 2006
INVENTOR(S) : Noboru Katta et al.

It is certified that error appears in the above-identified patent and that said Letters Patent is hereby corrected as shown below:

On the Title Page

On page 2, item 56 right column, line 7, "6-14419" should read --5-14419--.

Signed and Sealed this

Twelfth Day of June, 2007

JON W. DUDAS
*Director of the United States Patent and Trademark Office*